(12) United States Patent
Licht et al.

(10) Patent No.: US 10,097,528 B2
(45) Date of Patent: Oct. 9, 2018

(54) NON-REPEATABLE CHALLENGE-RESPONSE AUTHENTICATION

(71) Applicant: NCR Corporation, Duluth, GA (US)

(72) Inventors: Yehoshua Zvi Licht, Alpharetta, GA (US); Joseph Arnold White, Encinitas, CA (US)

(73) Assignee: NCR Corporation, Atlanta, GA (US)

( * ) Notice: Subject to any disclaimer, the term of this patent is extended or adjusted under 35 U.S.C. 154(b) by 111 days.

(21) Appl. No.: 15/055,564

(22) Filed: Feb. 27, 2016

(65) Prior Publication Data

US 2017/0250968 A1    Aug. 31, 2017

(51) Int. Cl.
G06F 21/31 (2013.01)
H04L 29/06 (2006.01)

(52) U.S. Cl.
CPC ................... *H04L 63/08* (2013.01)

(58) Field of Classification Search
CPC ....................................... H04L 63/08
See application file for complete search history.

(56) References Cited

U.S. PATENT DOCUMENTS

| | | | | |
|---|---|---|---|---|
| 7,146,002 B1* | 12/2006 | Smith | ................ | H04M 3/5232 379/265.13 |
| 8,955,066 B1* | 2/2015 | Ackerman | ............ | G06F 21/316 726/5 |
| 9,331,991 B2* | 5/2016 | Cheng | ................... | G06F 21/41 |
| 2010/0024013 A1* | 1/2010 | Cheng | ................... | G06F 21/41 726/5 |
| 2012/0167171 A1* | 6/2012 | Jung | ........................ | G06F 21/31 726/2 |
| 2013/0325897 A1* | 12/2013 | Motgi | ............... | G06F 17/30699 707/776 |
| 2014/0351263 A1* | 11/2014 | McConnell | ....... | G06F 17/30699 707/748 |
| 2015/0026796 A1* | 1/2015 | Alan | ........................ | G06F 21/31 726/19 |
| 2015/0106377 A1* | 4/2015 | Sri | ........................... | G09B 7/00 707/740 |
| 2017/0132675 A1* | 5/2017 | Myers | ................ | G06Q 30/0282 |
| 2017/0149771 A1* | 5/2017 | Vincent | ............. | G06Q 10/1095 |

* cited by examiner

*Primary Examiner* — Joseph P Hirl
*Assistant Examiner* — Sayed Beheshti Shirazi
(74) *Attorney, Agent, or Firm* — Schwegman, Lundberg & Woessner

(57) ABSTRACT

User data is aggregated across a plurality of electronic communication channels and domains. An online system initially authenticates a user for access to the online system over a network. The online system provides a user identifier for the user to an authentication service. The authentication service generates a non-repeatable challenge from the aggregated user data for the user identifier and provides the non-repeatable challenge to the online system. The online system provides the challenge to the user and receives a response from the user. The online system provides the response to the authentication service and the authentication sends a success or failure back to the online system based on the response to the challenge, and based on the success or failure the online system makes a final determination for authenticating the user for accessing to the online system.

1 Claim, 5 Drawing Sheets

NON-REPEATABLE CHALLENGE-RESPONSE AUTHENTICATION

BACKGROUND

Electronic security is a paramount concern in today's highly connected society. Nearly everything about a consumer is being captured daily and private information about the consumer is stored on a variety of online-accessible services.

Nearly a day does not go by when one hears about some online system being hacked and consumer information being exposed.

Most, authentication to these online systems still use a basic user identifier and password combination for authentication. Some, still even store the passwords of the users; rather, than using a hashing technique to store a key that is derived from the consumer selected password, which makes these type of online systems even more vulnerable to hacking.

Many online systems have moved to both a user identifier and password combination combined with one or more challenge questions to accomplish a multifactor approach in attempts to thwart hacking. However, often users cannot even remember the answer they provided for the questions they selected, which frustrates the users and results in the users having to reset their passwords. Moreover, these approaches are static, meaning that the consumer selects from a list of available questions pre-determined the online system and the consumer provides answers to the selected questions. This gets stored on the online system site and many online systems use the same types of questions, which means if one online system is hacked the user can be vulnerable on another online system. Still further, the answers to these static questions are often very easy for a hacker to guess. In short these approaches used in the industry are repeatable from system to system, easy to guess, and stored within the systems (making these approaches less than ideal).

SUMMARY

In various embodiments, methods and a system for non-repeatable challenge-response authentication are presented.

According to an embodiment, a method for non-repeatable challenge-response authentication is provided. Specifically, in an embodiment, a user-specific and non-repeatable challenge and a response is generated for a user being authenticated by an authentication system. Next, the user-specific and non-repeatable challenge is provided to the authentication system. In response to providing the challenge, a proposed response is received from the authentication system. Finally, an indication of success or failure is sent to the authentication system based on comparison of the proposed response and the response.

DETAILED DESCRIPTION

Figure 1A:
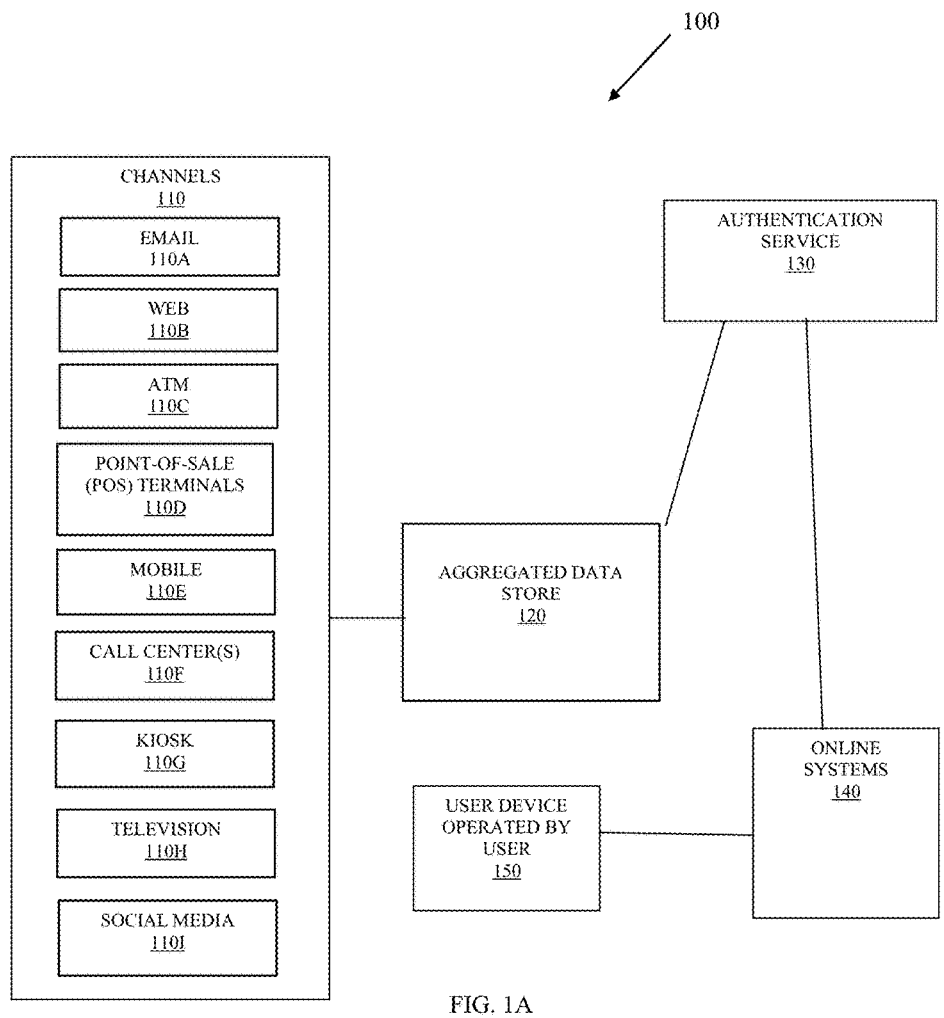
FIG. 1A is a diagram of a system for non-repeatable challenge-response authentication, according to an example embodiment.

FIG. 1A is a diagram of a system 100 for non-repeatable challenge-response authentication, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the channel integration processing presented herein and below.

Moreover, various components are illustrated as one or more software modules, which residing in non-transitory storage and/or hardware memory as executable instructions that when executed by one or more hardware processors perform the processing discussed herein and below.

The techniques, methods, and systems presented herein and below for non-repeatable challenge-response authentication can be implemented in all, or some combination of the components shown in different hardware computing devices having one or more hardware processors.

The system 100 includes electronic communication channels 110, an aggregated data store 120, an authentication service 130, a variety of online systems 140 (or online services accessible electronically over a network (wired, wirelessly, or a combination of wired and wireless)), and at least one user device operated by a user (or customer of one of the online systems 140).

The channels 110 illustrate electronic communication types that can be associated with one or more different communication devices accessible to an operator (user, customer, consumer, clerk, teller, etc.). The channels 110 capture transactions of the consumer over these different channels 110, such as purchases, entertainment ticket redemption, gaming, social media, and the like. Again, the customer can access one of these channels 110 with their own device or an operator may cause the transactions for the customer to be entered on the channels 110.

In the embodiment, illustrated in the FIG. 1, the channels 110 include: an email channel 110A, a web channel 110B, an Automated Teller Machine (ATM) channel 110C, a Point-Of-Sale (POS) terminal channel 110D, a mobile channel 110E (including text messaging, application based, web based channels), a call center channel 110F, a kiosk channel 110G, a television channel 110H, and a social media channel 110I.

The transaction data (purchases, social media transactions, venue ticket redemption, gaming, etc.) may be captured by a variety of online systems 140 or provided from online systems 140 to third-parties for management. In fact, some of this data can be purchased by third-parties for reselling to other marketers, retailers, etc.

The aggregated data store 120 represents an aggregation of this transaction data for users (customers or consumers). The transaction data can include a variety of rich data on the user, such as, and by way of example only, customer name, customer account, customer identifier, credit card used, date and time of transaction, item purchased, retailer where purchased, venue of ticket redemption, type of venue, event held at the venue, restaurant visited, food ordered, and the like. In fact, anything that is captured electronically during a transaction can be captured. This data when natively captured may be in a retail or venue-specific format or may even be unstructured. The aggregated data store 120 represents a normalized data format for the transaction data and represents an aggregation of this data. It is not necessary for the aggregated data store 120 to have all customer aggregated data housed in the aggregated data store, such that just those transactions for which the transaction data can be obtained (either through licensing, customer approval, retail agreements, and the like) may be aggregated within the aggregated data store 120. Although, there is no technical impediments to having all such data in the aggregated data store 120 just legal impediments. Therefore, in some cases, the aggregated data store 120 includes all transaction data captured for a customer.

The authentication service 130 can be a Software as a Service (SaaS) or can be a black box (from the perspective of the online system 140 that integrates the black box into its computing environment. The authentication service 130 aggregates the aggregated data by customer (based on identifying information for the customer, such as identifiers, names, addresses, loyalty numbers, account numbers, or combinations of these things), such that each customer has an aggregation of their transaction data accessible to the authentication service 130 through searching on customer identifiers to retrieve as a result of that search the normalized transaction history for the customer.

Customers managed within the aggregated data store 120 by the authentication service 130 can also be grouped into customer segments or domains based on similar transactional behaviors, such as same gender, same age, same geographical region, same products purchased with some regularity, same venues or restaurants visited with some regularity, etc. This can be done by the authentication service 130 using customer segmentation approaches known in the industry.

The domains or segments permit the authentication service 120 to generate templates of questions based on a given domain or segment. For example, what was the last restaurant that you ate at, what was the last product you bought from a sporting goods store, etc. These templates provide a human readable question that can be presented as a challenge in a challenge-response authentication session. The templates can include thousands of fill in the blank (identified by variables for substitution with the template) information that the authentication service can populated with data from the aggregated data store 120 for any given customer. For example, one template challenge question may appear as "what type of X did you purchase on Y at Z." In this example, for a given customer if this template question was selected, the authentication service can populate the variables X, Y, and Z by searching the aggregated transaction data for a customer identifier and replacing X with "milk," Y with "today, yesterday, a specific day of the week, a specific time of day, or a specific date," and Z with Kroger's™." The challenge question can also use the template to substitute potential answers (which the customer later selects as a response (answer)) that the authentication service knows to be false. For example, because a type of product is milk, identifiers for milk can allow the authentication service to generate known incorrect answers for the challenge question, such as 1% milk or whole milk when the authentication service knows the answer based on searching the customer's aggregated transaction data and can search the aggregated data store 120 for milk product types and locate different types of milk to populated in the template (again using substitutions for variables defined in the template). So, the end result may be a challenge question that is automatically, dynamically, and in real-time generated as follows:

What type of milk did you buy today from Kroger?
A. 1%
B. 2%
C. Whole
D. Not listed
E. Never bought any milk It is noted that there is an infinite number of possible questions and question formats and the above example was presented to illustrate how one specific question can be generated by the authentication service 130 using the aggregated data store 120. The robustness of the templates and domain classifications for the customers and the templates and the ongoing real-time transaction data being captured for the customers permit this scenario.

The authentication service can also maintain a listing by customer of previous template questions used for challenge-response authentication to ensure that no challenge-response question is ever repeated when assisting in authenticating that customer.

The generation of the challenge-response processing of the authentication service 130 is also temporal-based and near in time to the latest transaction activity associated with the customer when the customer is in need of challenge-response authentication with an online system 140. This is also much different from conventional challenge response authentication that relies on old and static information about the customer (which is capable of being compromised and which is repeated many times for the customer to respond to during different authentication sessions).

During operation of the system 100, a customer authenticates with a selected online system 140 to access that customers account and resources of that online system 140. This can be any existing authentication approach being used by that online system 140 such as an identifier and password. The customer operates the user device 150, which can be a phone, a laptop, a desktop computer, a television, a wearable processing device, or any other device capable of establishing an electronic communication session with the online system 140 over a network connection (wired, wireless, or a combination of wired and wireless).

The online system 140 authenticates the customer via its authentication mechanism as a first factor authentication. Next, the authentication mechanism upon success authentication of the customer is modified with an interface to connect to the authentication service 130 and provide a customer identifier along with a request for a challenge question or a set of challenge questions back from the authentication service 130 as a second factor or multifactor authentication.

The authentication service 130 uses the templates and the processing described above along with the customer identifier to identify a customer domain set of templates and to search the customers aggregated transaction data and generates one or more challenge questions that is sent back to the authentication mechanism of the online system 140. The online system 140 sends those challenge questions to the user operated device 150 and the user makes selections as responses (answers) provided back to the online system 140.

The online system 140 sends the answers back to the authentication service 130 and the authentication service 130 compares the provided answers (responses) against what the authentication service 130 expects to be the answers based on the search results from searching the customers aggregated transaction data for the challenge questions presented originally. When the answers match, the authentication service 130 sends an authenticated message back to the online system 140 and the online system 140 permits the customer to access the online system's resources as an authenticated user. When the answers do not match, the customer is either denied asked or asked if the customer would like to try another set of challenge-response questions, in which case, the processing described iterates between the online system 140, the authentication service 130, and the user operated device 150. The number of iterations can be set by an authentication policy set by the online system 140.

A few things are worthy of noting from a security perspective in the above described processing. First, the questions are generated dynamically and do not repeat. Second, answers to the questions are based on recent in time transaction activity of the customer. Third, the online system 140 never stores, records, or keeps the questions or answers, which means that if the online system 140 is hacked there would be nothing to obtain. Fourth, once a challenge-response is processed by the authentication service 130 the specific questions and answers are not retained in specific storage location; that is, the authentication service 130 only needs an identifier for a question asked from a template (also associated with an identifier) to realize that the question is never to be asked again and does not need to store anywhere the actual populated template values from the transaction data and the known answer. So, anyone that hacked the authentication service 130 would not be able to reproduce the same exact question and answer and even if a hacker could it would have been flagged as previously asked and answered. Therefore, for all these reasons and more the authentication service 130 provides a superior, nearness in time, behavioral transaction based, non-repeatable, multi-factor challenge-response authentication, which the industry cannot do and has not done.

It is also noted that a customer can be associated with many different domains or segments and as such many different domain templates can be selected from by the authentication service 130 when generating non-repeatable challenge questions. Additionally, challenge questions can come from different channel activity of the customer. For example, the above milk example can also include a question relevant to a different template and different transaction activity of the customer occurring over a different channel 110, such challenge question may appear, as one example, as follows.

What social media site did you make a posting to today?
A. Twitter™
B. FaceBook™
C. Facebook™ and Twitter™
D. I did not post today Moreover, because customer behavior changes over time so does the domains to which the customer belongs and the questions that the customer is asked. In this manner, the authentication service 130 may be viewed as capable of machine learning by regularly evaluating what domain or domains the customer should be assigned to; based on behavioral transaction patterns changing over time for the customer.

One can appreciate the superior power of this type of authentication security, by generating non-repeatable challenges based on recent customer-specific behavior known only by the customer and occurring over different channels 110 with a nearness in time to the time challenge-response authentication is requested at an online system 140.

Figure 1B:
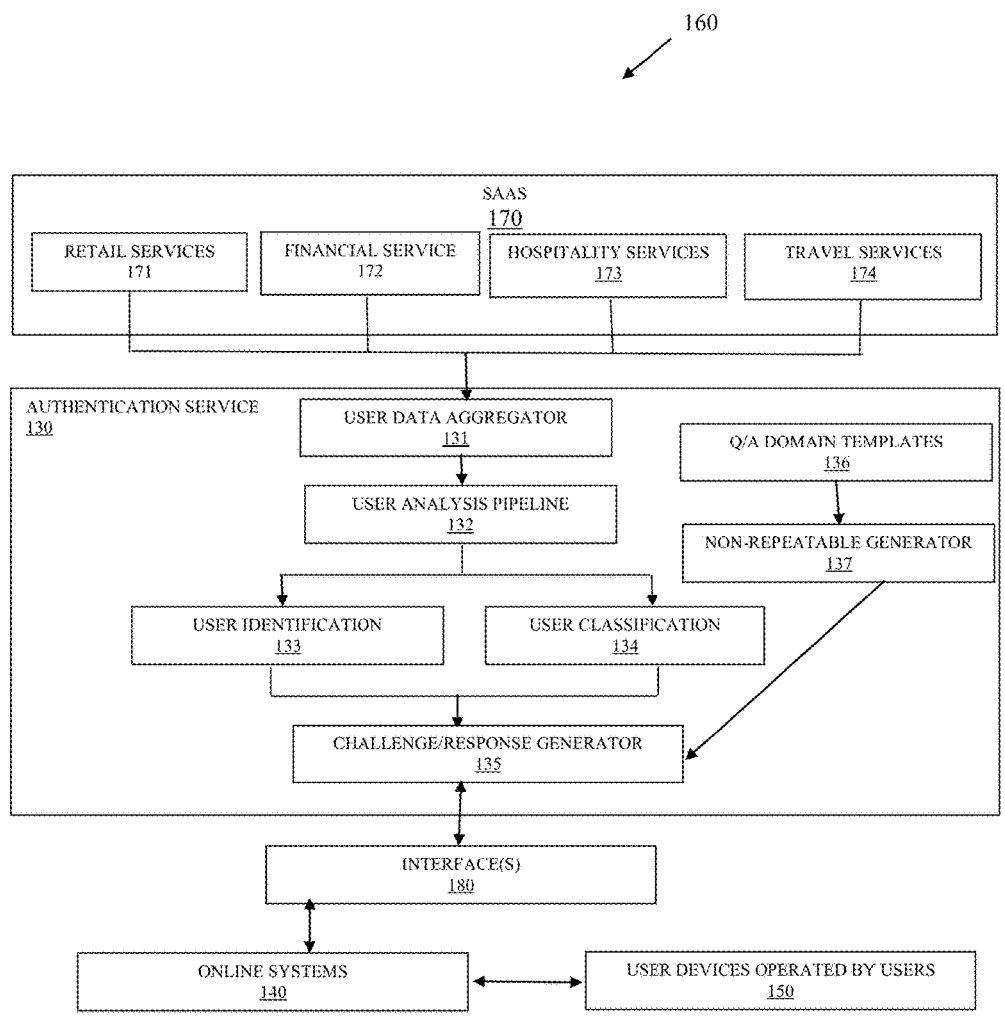
FIG. 1B is a diagram a sample retail-based architecture for practicing non-repeatable challenge-response authentication, according to an example embodiment.

The FIG. 1B is not discussed with reference to a specific retail example implementation of the authentication service 130.

FIG. 1B is a diagram a sample retail-based architecture 160 for practicing non-repeatable challenge-response authentication, according to an example embodiment.

The architecture 160 includes a plurality of SaaS products accessible online 170, the authentication service 130 (albeit with a slightly different arrangement and more detail from FIG. 1A), interfaces 180, online systems 140, and user devices operated by users 150.

The SaaS products 170 include (in this sample embodiment) retail services 171, financial services 172, hospitality services 173, and travel services 174.

The authentication service includes sub-processing modules that include: a user data aggregator 131, a user analysis pipeline 132, a user identification module 133, a user classification module 134, a Questions/Answers (Q/A) templates 136, and a non-repeatable challenge-response generator 137.

The architecture 100 assumes (although not illustrated in the FIG. 1B) the aggregated data store 120, which is a Big Data store that holds all the user activity history (transaction (financial, venue, travel, social) collected or culled from different domains (channels 110 and systems). Some sources of the Big Data are illustrated in the FIG. 1B as the retail services 171, the financial services 172, the hospitality services 173, and the travel services (although other sources can exist as well and as discussed above in the FIG. 1A). A separate external service (not illustrated) can be configured to cull and collect these sources of Big Data) to feed the aggregated data store 120.

The user aggregator 131 aggregates and collects all the user information and activity in structured or unstructured formats from the different domains (sources). This information (transactional data as discussed above in the FIG. 1A) is then normalized in a structured format and housed in the aggregated data store 120.

The user analysis pipeline 132 assembles the user data and builds classifications (domains or segments) for all the users in the aggregated data store 120.

The user identification module 133 executes as part of the user analysis pipeline 132 and generates a unique identification for each user (name, address, age, credit cards, loyalty accounts, accounts, etc.).

The user classification module 134 also executes as part of the user analysis pipeline 132 and defines each user to relevant classifications that the user is to be linked to and associated with.

The Q/A domain templates 136 utilizes machine learning for generating unique and non-repeatable questions and answers (challenge and responses) based on templates associated to specific classifications or domains. This can be done by using feedback from previous questions and answers and percentage of succeeding in authentication with those previous questions and answers. This also processes in the manner and using templates as discussed above with the FIG. 1A.

The Q/A generator 137 is a controller for interfacing the questions and validating the returned answers of the interfaces 180. In an embodiment, the interface 180 is a single Representational State Transfer (REST) interface that exposes itself to the online systems 140 for communication of the questions and for an indication as to whether the returned answers are authenticated or not authenticated. The Q/A generator drives the processing of the authentication service 130 for interacting and providing a specific user with challenge questions and possible answers and validating the returned answers (as described above in the FIG. 1A).

The challenge-response generator 135 directly interacts with the interfaces 180 (can be RESTful interfaces 180 as discussed above) and with the Q/A generator 137.

The processing between the challenge-response generator 135, the interfaces 180, the online systems 140, and the user devices 150 remains the same as what was presented above in the discussion of the FIG. 1A.

Again, the authentication service 130 provides a variety of novel security benefits, such as: can be deployed in areas known to steal identification such as any system today where questions for an answers for authentication are static and mimicked; the Q/A are generated dynamically and on the fly and are not persisted for an iteration of a different authentication session; each Q/A is unique to a specific user that only the user would know and any additional Q/A are not repeated such that finding any pattern by a hacker will be extremely difficult; the Big Data will deter any ability to quickly find an answer even if a hacker had access to the Big Data and by the time an answer is found the authentication session with an online system 140 will have timed out and any next question will be entirely different; the Q/A are generated from a variety of different aspects (domains and channels) relevant to just a specific user; and the authentication service 130 can be deployed as a SaaS to the online systems 140 to augment their authentication mechanisms for performing multifactor authentication. In fact, in some cases, the online systems 140 can replace their first factor identification with just a user identifier and outsource authentication based on that identifier to the SaaS authentication service 130.

In an embodiment, the authentication service can also be installed within the processing environment of the online system 140 as a block box to augment or replace authentication for that online system 140. This may be desirable for sensitive online systems 140 such as financial systems.

These and other embodiments are no discussed with reference to the FIGS. 2-4.

Figure 2:
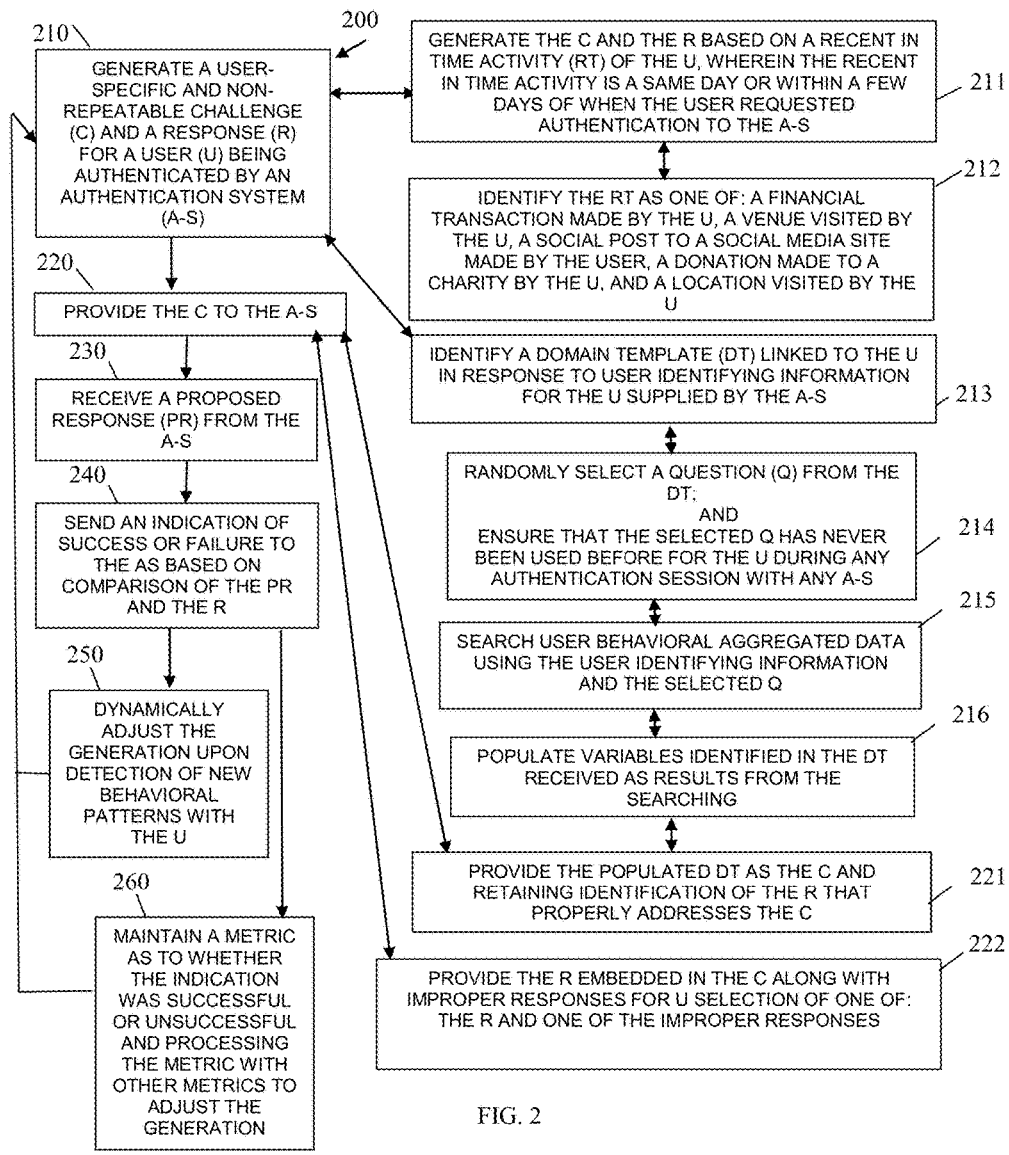
FIG. 2 is a diagram of a method for non-repeatable challenge-response authentication, according to an example embodiment.

FIG. 2 is a diagram of a method 200 for non-repeatable challenge-response authentication, according to an example embodiment. The software module(s) that implements the method 300 is referred to as an "authentication manager." The authentication manager is implemented as executable instructions programmed and residing within memory and/or a non-transitory computer-readable (processor-readable) storage medium and executed by one or more hardware processors of a hardware computing device. The processors of the device that executes the authentication manager are specifically configured and programmed to process the authentication manager. The authentication manager has access to one or more networks during its processing. The networks can be wired, wireless, or a combination of wired and wireless.

In an embodiment, the device that executes the authentication manager is a server.

In an embodiment, the device that executes the authentication manager is a proxy to an existing online system 140.

In an embodiment, the device that executes the authentication manager is a cloud processing environment having a variety of hardware devices logically organized as a single processing environment.

In an embodiment, the authentication manager is the authentication service 130.

At 210, the authentication manager generates a user-specific and non-repeatable challenge and a response for a user being authenticated by an authentication system. The manner in which this is done was presented above with respect to the FIGS. 1A-1B. In an embodiment, the authentication system is part of the online system 140.

According to an embodiment, at 211, the authentication manager generates the user-specific and non-repeatable challenge and response based on a recent in time activity of the user. The recent in time activity is defined as being the same day or within a few days of when the user requested authentication by the authentication system.

In an embodiment of 211 and at 212, the authentication manager identifies the recent in time activity as one of: a financial transaction made by the user, a venue visited by the user, a social post to a social media site made by the user, a donation made by the user to a charity, and a location visited by the user.

In an embodiment, at 213, the authentication manager identifies a domain template linked to the user in response to user identifying information for the user supplied by the authentication system. Creation of and linkage of the user to domain-specific templates and processing of the templates was discussed above with respect to the FIGS. 1A-1B.

In an embodiment of 213 and at 214, the authentication manager randomly selects a quest from the domain template. The authentication manager also ensures that the selected question has never been used before for the user during any authentication session with any authentication system.

In an embodiment of 214 and at 215, the authentication manager searches user behavioral aggregated data using the user identifying information and the selected question.

In an embodiment of 215 and at 216, the authentication manager populates variables identified in the domain template received as results from the searching.

At 220, the authentication manager provides the user-specific and non-repeatable challenge to the authentication system.

In an embodiment of 216 and at 221, the authentication manager provides the populated domain template as the user-specific and non-repeatable challenge and retaining identification of the response that properly addresses the user-specific and non-repeatable challenge.

According to an embodiment, at 222, the authentication manager provides the response embedded in the user-specific and non-repeatable challenge along with improper responses for user selection of one of: the response and one of the improper responses.

At 230, the authentication manager receives a proposed response from the authentication system.

At 240, the authentication manager send an indication of success or failure to the authentication system based on comparison of the proposed response and the response.

According to an embodiment, at 250, the authentication manager dynamically adjusts the generation processing of 210 upon detection of new behavioral patterns with the user.

In an embodiment, at 260, the authentication manager maintains a metric as to whether the indication was successful or unsuccessful. The authentication manager also processes the metric and other previously captured metrics to adjust the generation processing of 210.

In an embodiment, the authentication manager interfaces with the authentication system through a RESTful interface presented to the authentication system.

Figure 3:
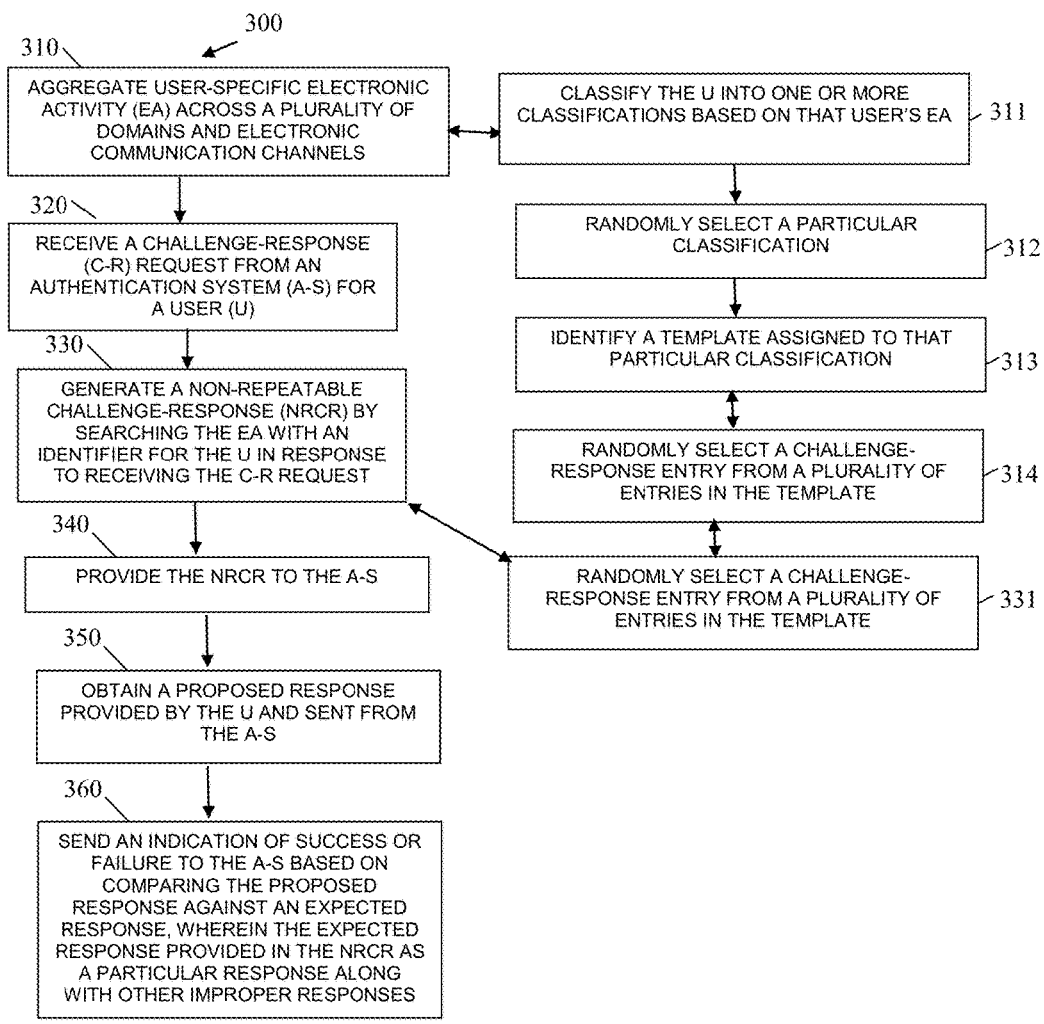
FIG. 3 is a diagram of another method for non-repeatable challenge-response authentication, according to an example embodiment.

FIG. 3 is a diagram of another method for non-repeatable challenge-response authentication, according to an example embodiment. The software module(s) that implements the method 300 is referred to as an "authentication service." The authentication service is implemented as executable instructions programmed and residing within memory and/or a non-transitory computer-readable (processor-readable) storage medium and executed by one or more hardware processors of a hardware device. The processors of the device that executes the authentication service are specifically configured and programmed to process the authentication service. The authentication service has access to one or more networks during its processing. The networks can be wired, wireless, or a combination of wired and wireless.

In an embodiment, the device that executes the authentication service is a server.

In an embodiment, the device that executes the authentication service is a proxy to an online system 140.

In an embodiment, the device that executes the authentication service is a cloud processing environment.

In an embodiment, the authentication service is the authentication service 130.

In an embodiment, the authentication service is the authentication manager of the FIG. 2.

In an embodiment, the authentication service is a combination of the authentication service 130 and the authentication manager of the FIG. 2.

At 310, the authentication service aggregates user-specific electronic activity across a plurality of domains and electronic communication channels. This was discussed in detail above with the FIGS. 1A-1B.

According to an embodiment, at 311, the authentication service classifies the user into one or more classifications based on that user's aggregated user-specific electronic activity.

In an embodiment of 311 and at 312, the authentication service randomly selects a particular classification.

In an embodiment of 312 and at 313, the authentication service identifies a template assigned to that particular classification.

In an embodiment of 313 and at 314, the authentication service randomly selects a challenge response entry from a plurality of entries in the template.

At 320, the authentication service receives a challenge-response request from an authentication system for the user.

At 330, the authentication service generates a non-repeatable challenge-response by searching the aggregated user-specific electronic activity with an identifier for the user in response to receiving the non-repeatable challenge-response.

In an embodiment of 314 and 330, at 331, the authentication service randomly selects a challenge-response entry from a plurality of entries in the template.

At 340, the authentication service provides the non-repeatable challenge-response to the authentication system.

At 350, the authentication service obtains a proposed response provided by the user and sent from the authentication system.

At 360, the authentication service sends an indication of success of failure to the authentication system based on comparing the proposed response against an expected response. The expected response provided in the non-repeatable challenge-response as a particular response along with other improper responses that the user may select as the proposed response.

Figure 4:
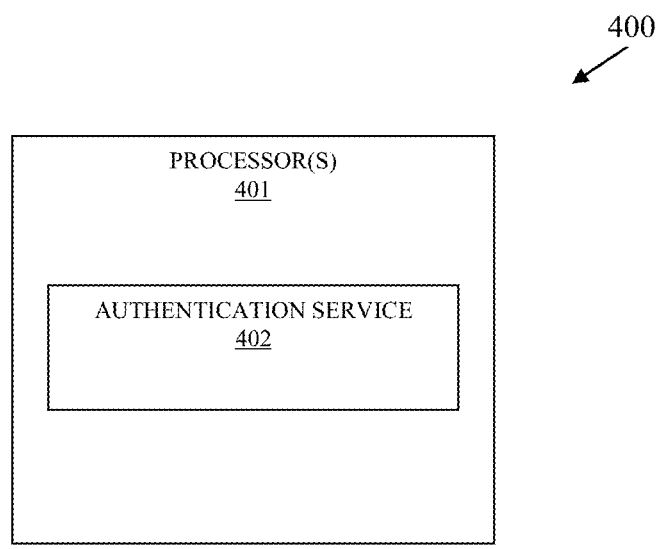
FIG. 4 is a diagram of a system for non-repeatable challenge-response authentication, according to an example embodiment.

FIG. 4 is a diagram of a system 400 for non-repeatable challenge-response authentication, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all, any, or some combination of the processing discussed above with the FIGS. 1A-1B and 2-3.

The system 400 includes at least one hardware processor 401 and an authentication service 402.

In an embodiment, the hardware processor 401 is part of a server.

In an embodiment, the hardware processor 401 is part of a proxy for an online system 140.

In an embodiment, the hardware processor is part of a cloud processing environment.

The authentication service 402 is configured to: execute on the processor 401, generate non-repeatable user-specific challenge-response questionnaires as requested by an authentication system for users based on recent electronically tracked activities for the users, and provides indications to the authentication system as to whether proposed responses by the users in response to answering the questionnaires were correct or incorrect.

In an embodiment, the questionnaires are multiple choice questions generated from templates in the manners discussed above.

In an embodiment, the authentication service 402 is further configured to perform a second factor authentication for the authentication system of the users, wherein the authentication system performs a first factor authentication of the users.

In an embodiment, the authentication service 402 is configured to one of: interface as a SaaS with the authentication system and integrate within a processing environment of an online system associated with the authentication system.

In an embodiment, the authentication service 402 is the authentication service 130.

In an embodiment, the authentication service 402 is the authentication manager of the FIG. 2.

In an embodiment, the authentication service 402 is the authentication service 130 of the FIG. 3.

In an embodiment, the authentication service 402 is deployed as a SaaS over a network.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
aggregating user-specific electronic activity across a plurality of domains and electronic communication channels, wherein aggregating further includes classifying the user into one or more classifications based on that user's aggregated user-specific electronic activity, wherein classifying further includes:
randomly selecting a particular classification;
identifying a template assigned to that particular classification;
randomly selecting a challenge-response entry from a plurality of entries in the template; and
augmenting the searching of the aggregated user-specific electronic activity with information identified in the challenge-response entry;
receiving a challenge-response request from an authentication system for a user;
generating a non-repeatable challenge-response by searching the aggregated user-specific electronic activity with an identifier for the user in response to receiving the challenge-response request;
providing the non-repeatable challenge-response to the authentication system;
obtaining a proposed response provided by the user and sent from the authentication system; and
sending an indication of success or failure to the authentication system based on comparing the proposed response against an expected response, wherein the expected response provided in the non-repeatable challenge-response as a particular response along with other improper responses and providing the user authenticated access to an online system based on the indication.

* * * * *